April 18, 1933.  O. M. LEWIS  1,904,004
BRAKE EQUALIZER
Filed Nov. 12, 1931
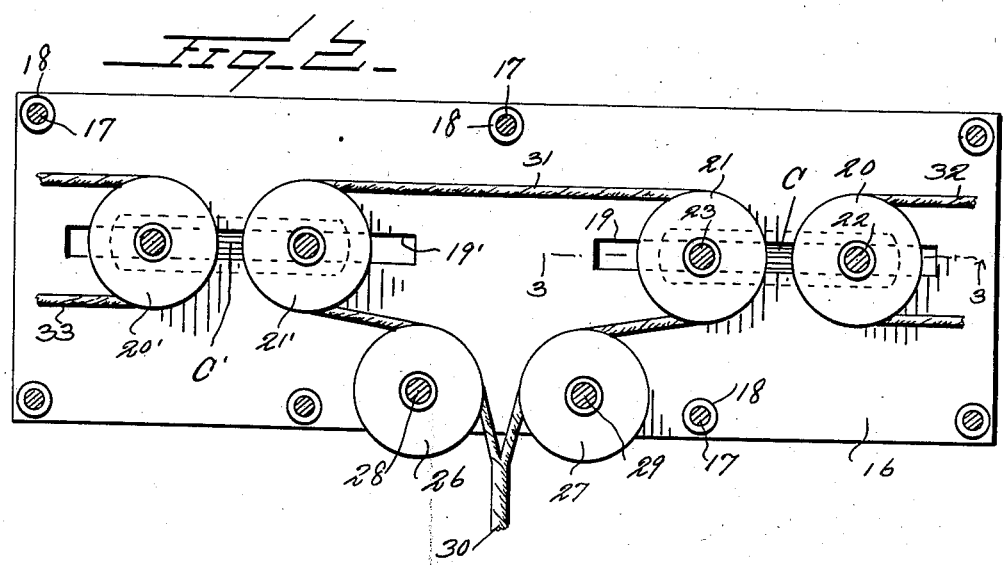
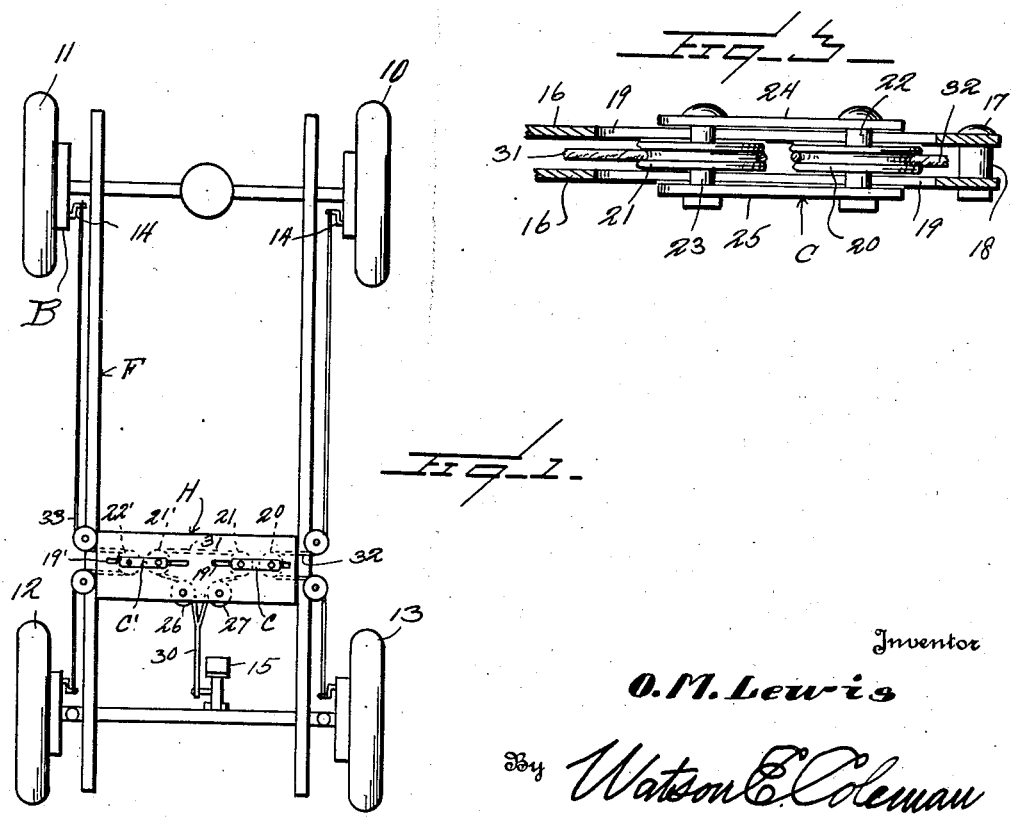
Inventor
O. M. Lewis
By Watson E. Coleman
Attorney Patented Apr. 18, 1933

1,904,004

UNITED STATES PATENT OFFICE

ORVAL M. LEWIS, OF SHELTON, WASHINGTON

BRAKE EQUALIZER

Application filed November 12, 1931. Serial No. 574,631.

This invention relates to brake equalizers, and more particularly to an equalizer adapted for use with mechanical brakes.

An object of this invention is to provide equalizing means which may be readily mounted on any conventional vehicle by means of which the pressure on the brakes will be equalized in the same manner as brakes of the hydraulic type.

Another object of this invention is to provide equalizing means of this kind which will eliminate the necessity of frequently adjusting the brakes when they become slightly worn and one brake becomes worn to a greater degree than the other brakes.

The above and various other objects and advantages of this invention will in part be described in and in part be understood from the following detailed description of the present preferred embodiment, the same being illustrated in the accompanying drawing, wherein:—

Figure 1 is a detail top plan view of a device constructed according to the preferred embodiment of this invention mounted on a conventional vehicle chassis;

Figure 2 is an enlarged longitudinal sectional view partly in detail of the equalizing device, and Figure 3 is a sectional view partly in detail taken on the line 3—3 of Figure 2.

Referring to the drawing wherein like numerals of reference designate corresponding parts throughout the several views, the letter F designates generally the frame or chassis of a vehicle of conventional construction having rear wheels 10 and 11 and front wheels 12 and 13. These wheels have the conventional brakes B associated therewith, which are actuated by means of a rock lever or crank 14.

In order to equalize the pressure applied by the pedal 15 on all of the brakes, I have provided an equalizing mechanism including a housing H constructed of opposed plates 16 which are held in spaced relation to each other by means of bolts or rivets 17 or the like, and a spacer or sleeve 18 is disposed about each bolt 17 and operates to space the plates 16 apart. These plates 16 are provided with elongated slots or guide openings 19 which extend transversely of the length of the frame F and disposed within these opposed slots 19 is positioned a carriage C, which has movement laterally of the frame F.

This carriage C comprises a pair of pulleys 20 and 21, which are rotatably mounted on shafts 22 and 23 carried by opposed connecting bars or plates 24 and 25, which are disposed on the outside surfaces of the plates 16. These bars or plates 24 are of a width greater than the width of the slot or guide 19, so that the pulleys 20 and 21 cannot move transversely of the plates 16, but will have longitudinal movement with respect thereto, which movement is transversely of the frame F. A second carriage C' is disposed in spaced relation to the carriage C and is slidably mounted in a slot or guide passage 19'. This carriage C' has pulleys 20' and 21' rotatably mounted therein in spaced relation to each other, the purpose for which will be hereinafter described.

A pair of pulleys 26 and 27 are rotatably mounted on shaft members 28 and 29 at a point intermediate the carriages C and C' and forwardly offset therefrom. These pulleys 26 and 27 have trained thereover a cable 30 which is provided with a loop 31 engaging over the pulleys 21 and 21'. The opposite end of the cable 30 is attached to the brake pedal 15 so that when the pedal 15 is rocked on its mounting, the cable 30 will be pulled forwardly and the loop 31 will draw the inner pulleys 21 and 21' toward each other, which action will move the carriages C and C' inwardly of the housing H.

A cable 32 is trained over the pulley 20 and connected at one end to the rock lever 14 of the brake drum of one wheel on one side of the vehicle, and the opposite end of the cable 32 is connected to the other wheel on the same side of the vehicle so that when the carriage C moves inwardly of the housing H, the rock levers 14 of the front and rear wheels 13 and 10, respectively, will be rocked so as to actuate the brake. In like manner, the pulley 20' has a cable or flexible member 33 trained thereover, one end of this cable 33 being attached to the brake of the rear wheel 11 and the other end attached to the brake of the front wheel 12, which wheels 11 and 12 are disposed on the same side of the vehicle.

It will be noted, from the foregoing, that when the loop 31 is drawn forwardly between the idling pulleys 26 and 27, the carriages C and C' will be pulled toward each other and that if one brake is not as tight as another brake, on the same side of the vehicle, the looser brake will be drawn to a greater extent than the tighter brake, thereby equalizing the pressure applied to these brakes by means of the pedal 15.

In the same manner, if the two brakes on one side of the vehicle are tighter than the two brakes on the opposite side of the vehicle, the carriage associated with the tighter brakes will move slower toward the center of the housing H than the opposed carriage, thereby equalizing the pressure applied by the pedal 15 on all four brakes. The housing H may be of either the closed or open type, that is, the marginal edges may be closed so as to prevent the dirt or other foreign particles from entering the housing and interfering with the free movement of the parts disposed therein. The housing H may be positioned at any desired point between the ends of the frame F of the vehicle, but is preferably positioned at a point slightly rearwardly of the brake pedal 15, but I, of course, do not wish to be limited to any particular position for this housing H, as it may be positioned at any other point within the limits of the frame F.

It is, of course, understood that various changes and modifications may be made in the details of construction and design of the above specifically described embodiment of this invention without departing from the spirit thereof, such changes and modifications being restricted only by the scope of the following claims.

What is claimed is:—

1. A brake equalizing means comprising cables conected one to each selected pair of the brakes of a vehicle, a carriage for each cable, a housing within which the carriages are slidable, and a carriage engaging cable connected to the brake pedal of the vehicle, each carriage comprising a pair of shafts, a pulley on each shaft, said housing having slots in opposite sides thereof to slidably receive the ends of said shafts, and connecting bars positioned one on each side of the housing and secured to the shafts for holding the shafts in spaced relation to each other.

2. A brake equalizing means comprising cables connected one to each selected pair of the brakes of a vehicle, a carriage for each cable, a housing within which the carriages are slidable, a pair of pulleys, means for mounting the pulleys in spaced relation to each other for rotation within the housing, and a carriage engaging cable trained over said pair of pulleys, each carriage comprising a pair of shafts, a pulley on each shaft, said housing having slots in opposite sides thereof to slidably receive the ends of said shafts, and connecting bars positioned one on each side of the housing and secured to the shafts for holding the shafts in spaced relation to each other.

In testimony whereof I hereunto affix my signature.

ORVAL M. LEWIS.